United States Patent [19]

Kimura et al.

[11] Patent Number: 4,555,545
[45] Date of Patent: Nov. 26, 1985

[54] COMPOSITION FOR COATING

[75] Inventors: Hiroshi Kimura; Ikurou Mori; Bunjirou Murai, all of Ohta, Japan

[73] Assignee: Toshiba Silicone Co., Ltd., Tokyo, Japan

[21] Appl. No.: 697,358

[22] Filed: Feb. 1, 1985

[30] Foreign Application Priority Data

Feb. 9, 1984 [JP] Japan .................................. 59-20893

[51] Int. Cl.$^4$ ............................................... C08L 83/00
[52] U.S. Cl. .................................... 524/858; 524/588; 524/859; 528/16; 528/26; 528/28; 528/29
[58] Field of Search ....................... 524/588, 858, 859; 528/26, 28, 29, 16

[56] References Cited

U.S. PATENT DOCUMENTS 4,141,926  2/1979  Ariga et al. ............................ 528/26
4,142,035  2/1979  Idel et al. .............................. 528/26

Primary Examiner—Melvyn I. Marquis
Attorney, Agent, or Firm—Gary L. Loser

[57] ABSTRACT

A composition for coating, which comprises:
(1) 100 parts by weight of film forming components comprising:
  (A) 10 to 90% by weight of an organosilane triol of the following formula and/or its partial condensate:

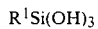

wherein $R^1$ represents a monovalent group selected from the group consisting of alkyl groups having 1 to 3 carbon atoms and aryl groups, and
  (B) 90 to 10% by weight of colloidal silica; and
(2) 5 to 40 parts by weight of a copolymer of:
  (C) a compound represented by the formula:

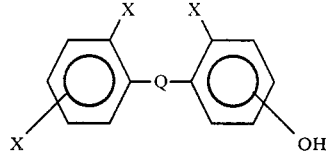

wherein Q represents >C=O or the following formula:

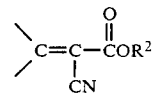

wherein each X may be either the same or different and each represents hydrogen atom or hydroxyl group, of which at least one is hydroxyl group, and $R^2$ represents an alkyl group having 1 to 18 carbon atoms, and
  (D) an epoxy group-containing trialkoxysilane.

4 Claims, No Drawings

COMPOSITION FOR COATING

The present application claims priority of Japanese patent application Ser. No. 84/20893, filed Feb. 9, 1984.

BACKGROUND OF THE INVENTION

The present invention relates to a composition for coating and, more particularly, to a composition for coating capable of forming a film having excellent abrasion resistance, adhesion, heat resistance and UV-ray resistance.

In recent years, transparent plastics, which are difficult to break and light in weight are finding many uses in place of glass panels. For example, at the present time, transparent glass produced from synthetic organic polymers has frequently been employed in transportation means such as railroad cars, buses, etc., optical instruments and construction materials.

However, transparent plastics, while having the above advantages, are liable to suffer from scratches or damage to the surface, whereby its transparency may be lowered to damage its appearance. Also, transparent plastics have the disadvantage of being easily discolored when exposed to UV-rays such as sunlight for a long time.

Accordingly, various attempts have been made to improve the abrasion resistance of transparent plastics. For example, Japanese Provisional Patent Publications No. 2736/1976, No. 87736/1979 and No. 94971/1980 disclose compositions for coating, comprising an aqueous dispersion of colloidal silica and a hydrolyzable organosilane compound dissolved or dispersed in a hydrolyzing solvent such as an alcohol or water. Generally speaking, it has been attempted to prevent the plastics from UV-ray deterioration due to exposure to sunlight by coating the plastics with such a composition for coating in which a UV-absorber is incorporated.

However, most UV-absorbers have the problem of being removed from the composition during the heat curing step through, for example, volatilization. Further, they also have the disadvantage of worsening adhesion to the plastics.

For overcoming these disadvantages, a UV-absorber comprising an alkylcarbamyl adduct of alkoxysilyl or alkanoylsilyl is exemplified in Japanese Provisional Patent Publication No. 21476/1982, but this method is not only complicated in its steps, but also very disadvantageous in its economical aspects. Further, in Japanese Provisional Patent Publications No. 10591/1983 and No. 8776/1983, a UV-absorber is obtained by reacting the hydroxyl group of an aromatic UV-absorber such as 2,4-dihydroxybenzophenone, etc. with the epoxy group of an epoxy-containing silane compound in the presence of tetramethylammonium chloride, but the film obtained by heat curing with addition of this product has the disadvantage of inferior heat resistance and water resistance.

SUMMARY OF THE INVENTION

An object of the present invention is to provide a composition for coating capable of forming a film having excellent characteristics such as UV-ray resistance, abrasion resistance, heat resistance, etc. on a substrate.

The composition for coating according to the present invention comprises:

(1) 100 parts by weight of film forming components comprising:

(A) 10 to 90% by weight of an organosilane triol of the following formula and/or its partial condensate:

$R^1Si(OH)_3$ wherein $R^1$ represents a monovalent group selected from the group consisting of alkyl groups having 1 to 3 carbon atoms and aryl groups, and (B) 90 to 10% by weight of colloidal silica; and (2) 5 to 40 parts by weight of a copolymer of:

(C) a compound represented by the formula:

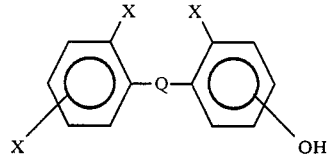

wherein Q represents $>C=O$ or the following formula:

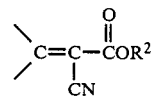

wherein each X may be either the same or different and represents hydrogen atom or hydroxyl group, of which at least one is hydroxyl group, and $R^2$ represents an alkyl group having 1 to 18 carbon atoms, and (D) an epoxy group-containing trialkoxysilane.

In other words, the specific feature of the present invention resides in adding a novel UV-absorber consisting of a copolymer obtained by reacting the hydroxyl group of an aromatic UV-absorber of the prior art (C) with the epoxy group of an epoxy group containing trialkoxysilane (D), and then reacting the hydroxyl group formed by ring opening of the epoxy group to react with the alkoxy groups of the trialkoxysilane, into a composition for coating. Already, a UV-absorber obtained by the reaction between the UV-absorber of the prior art (C) and the silane compound having an epoxy group (D) is disclosed in Japanese Provisional Patent Publication No. 10591/1983. However, the coating compositions of the present invention and Japanese Provisional Patent Publication No. 10591/1983 are different in that the UV-absorber in said Publication is a condensate (not a polymer) between the UV-absorber and the epoxy group-containing silane compound, which is obtained by use of an alkyl quaternary ammonium salt as the catalyst for the reaction, while that of the present invention is a copolymer of the UV-absorber of the prior art with the epoxy group-containing silane compound, which is obtained by use of an aluminum chelate compound as the catalyst. In this respect, the composition comprising Component (A) and Component (B) is known per se as a coating agent having excellent abrasion resistance.

DESCRIPTION OF THE INVENTION

In the organosilane triol represented by the formula $R^1Si(OH)_3$ and/or its partial condensate (A), $R^1$ represents a monovalent group selected from the group consisting of alkyl groups having 1 to 3 carbon atoms and aryl groups. Typical examples of alkyl groups having 1 to 3 carbon atoms are methyl, ethyl and propyl, and a typical example of aryl group is phenyl. The amount of Component (A) formulated is 10 to 90% by weight based on the total film forming components comprising (A) and (B). With an amount less than 10% by weight, cracks are formed making it difficult to form a continuous film, while an amount over 90% by weight does not give adequate hardness of the film. Colloidal silica is generally stabilized with Na₂O, and for the purpose of more easily controlling the composition for coating and further maintaining its stability, the content of Na₂O should preferably be not more than 0.35% by weight based on the solid components of colloidal silica.

The partial condensate of the organosilane triol is obtained by, for example, hydrolyzing an organotrialkoxysilane represented by the formula: $R^1Si(OR^3)_3$ (wherein $R^1$ is the same as defined above, and $R^3$ is an alkyl radical having 1 to 4 carbon atoms) in an aqueous dispersion of colloidal silica in the presence of a catalyst. The catalyst for hydrolysis to be used here may be exemplified by organic acids such as anhydrous acetic acid, glacial acetic acid, propionic acid, citric acid, benzoic acid, formic acid, oxalic acid, etc.; aluminum chelate compounds such as aluminum acetylacetonate, aluminum-n-butoxymonoethylacetoacetate, etc. Among them, anhydrous acetic acid and glacial acetic acid are preferred.

The colloidal silica (B) is usually employed in the form of an aqueous dispersion. Examples of such dispersions are Snowtex (trade name, produced by Nissan Kagaku K.K.) and Ludox (trade name, produced by Du Pont de Nemours & Co.). The colloidal silica may be either acidic or basic. The amount of the colloidal silica formulated is 90 to 10% by weight based on the total film forming components comprising (A) and (B).

The UV-absorber (2) to be used in the present invention is a copolymer of an aromatic compound (C) with an epoxy group-containing trialkoxysilane (D). Of these components, Component (C) can be utilized alone as the UV-absorber. Examples of such a Component (C) are shown below:

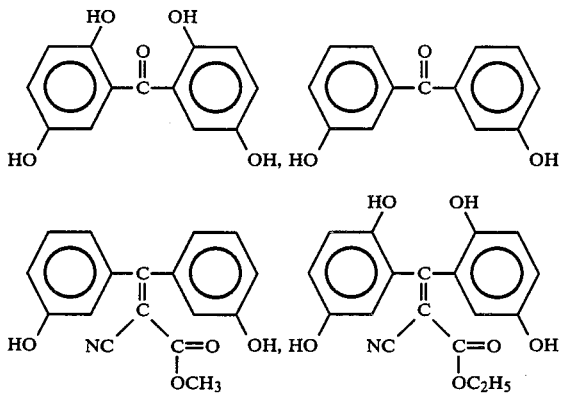

In view of its availability, 2,4-dihydroxybenzo-phenone is preferred. On the other hand, Component (D) is required to have three alkoxy groups in order to permit copolymer (2) containing this as the recurring unit to be dissolved sufficiently in the composition of the present invention and undergo copolymerization with the partial condensate of organosilane triol (A) (polysiloxane). Examples of epoxy group-containing trialkoxysilanes may include γ-glycidoxypropyltrimethoxysilane, γ-glycidoxypropyltriethoxysilane, γ-glycidoxypropyltripropoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane and the like. In view of its availability, an epoxy group containing trimethoxysilane is preferred.

The UV-absorber containing Component (C) and Component (D) as recurring units may be obtained by heating these components at a temperature within the range of from 120° to 170° C. for 4 to 10 hours in the presence of, for example, an aluminum chelate catalyst represented by the formula:

Al(OR⁴)ₙL₃₋ₙ wherein R⁴ is an alkyl group having 1 to 4 carbon atoms, L represents a group of the formula:

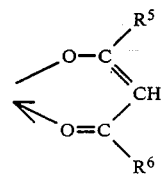

R⁵ represents an alkyl group having 1 or 2 carbon atoms, R⁶ represents an alkyl group or an alkoxy group each having 1 or 2 carbon atoms, and n represents 0, 1 or 2.

The reaction may be carried out in the absence of a solvent or in a solvent capable of dissolving both Component (C) and Component (D). It is preferable to use a solvent because the reaction can be more easily controlled. Examples of suitable solvents include toluene, xylene, ethyl acetate, butyl acetate and the like. The reaction should preferably be continued, while distilling out the alcohol formed during the reaction. The aluminum chelate catalyst is inclusive of aluminum trisacetylacetonate, aluminum ethylacetoacetate bisacetylacetonate, aluminum bisethylacetoacetate acetylacetonate, aluminum diisopropoxymonoacetylacetonate, aluminum di-n-butoxymonoethylacetate, and the like. For ease of handling and reaction, aluminum trisacetylacetonate is preferred.

In the above reaction, the amount of Component (D) is not particularly limited, but preferably is from 1 to 3 moles, and, more preferably is from 1.2 to 2.5 moles, per mole of Component (C). At a level of less than 1 mole of Component (D) per mole of Component (C), the compound obtained by the present method is converted into a high molecular weight compound which is highly viscous and difficult to handle. Also, it becomes undesirably lowered in solubility when adding to a composition for coating. On the other hand, when Component (D) exceeds 3 moles, when the UV-absorber obtained from the above reaction is added to the film forming Components comprising (A) and (B), Component (C) participating in UV-ray absorption falls short of its absolute amount. Thus the amount of said absorber must be increased which results in lowering abrasion resistance, which is the principal object of improvement of the composition for coating of the present invention. On the other hand, the amount of aluminum chelate compound to be formulated, which is not particularly limited, may preferably be 0.005 to 10 parts by weight, and more preferably 0.01 to 5 parts by weight, based on 100 parts by weight of the total amount of Component (C) and Component (D). With a catalyst amount of less than 0.005 parts by weight, it will take a long time for the reaction, while an amount over 10 parts by weight will undesirably lower the stability of the composition when the copolymer obtained by the present invention is incorporated in the composition for coating. The UV-absorber (2) may also contain two or more kinds of (C) or (D) as recurring units therein.

From the above reaction, a copolymer having a molecular weight of about $10^3$ to $10^5$ can be obtained. Such a copolymer is formulated as the UV-absorber in the composition for coating of the present invention. The amount of the UV-absorber to be formulated may be 5 to 40 parts by weight, preferably 15 to 30 parts by weight per 100 parts by weight of the film forming components. If the amount formulated is less than 5 parts weight, the UV-ray absorbing effect is insufficient, while an amount exceeding 40 parts weight will undesirably lower abrasion resistance.

The composition for coating of the present invention may also contain, if desired, leveling agents, thickeners, pigments, dyes, antioxidants, modifiers, etc.

The composition for coating of the present invention can be prepared according to, for example, the methods described below. First, an aqueous dispersion of colloidal silica is added to a solution of an organotrialkoxysilane containing a suitable hydrolyzing catalyst. The temperature is maintained within the range of 20° to 25° C. After completion of hydrolysis, the solution is diluted with a hydrophilic organic solvent in order to control the content of solids in the solution. Such a solvent may be exemplified by alcohols such as methanol, ethanol, propanol, isopropanol, n-butyl alcohol, isobutyl alcohol, diacetone alcohol, etc.; ethylene glycol derivatives such as ethylene glycol monobutyl ether, ethylene glycol monoethyl ether acetate, etc. The organic solvent may be selected depending on the coating method such as dip coating, spray coating, flow coating, etc. During this operation, the solid content should preferably be adjusted to 15 to 25% by weight. After completion of hydrolysis, for the purpose of removing excessive water from the aqueous dispersion of colloidal silica, a lower aliphatic alcohol may be added into such a solution for azeotropic evaporation while controlling the condensation reaction to prepare a composition similar to that as described above. According to this method, the upper limit of the aforesaid organic solvent can be set to 40% by weight. Finally, by addition of a predetermined amount of the UV-absorber to the above composition, the composition for coating of the present invention can be obtained.

Such a composition is applied on a substrate to a thickness of 0.5 to 20μ, preferably 2 to 10μ, by such methods as flow coating, spray coating or dip coating.

The substrate material for coating of the composition of the present invention may include transparent or opaque plastics or metals. Plastics substrates may include, for example, acrylic resins, polyester resins, polyimide resins, polyamide resins, acrylonitrile-butadiene copolymer resins, polyvinyl chloride resins, polyethylene resins, polycarbonate resins, etc. The composition of the present invention is particularly useful as the coating agent for polycarbonate resins. Also, as the metal substrates, there may be included lustrous or non-lustrous metals such as aluminum, and chromium alloys subjected to sputtering. Further, the composition of the present invention can also be applied on substrate surfaces such as of wood, leather, glass, ceramics, etc. It is also useful for paints in which an organic resin is formulated as vehicle (e.g. urethane paints, acrylic paints, epoxy paints, melamine-alkyd paints, alkyd paints, polyester paints). In the case where there is poor adhesion to the substrate, the substrate surface can be pre-treated with a primer, whereby substantially all of the solid material surfaces can be coated with the composition.

The composition of the present invention applied on the substrate as described above can be cured to form a continuous film by heating to a temperature of about 120° C. even when adding no curing catalyst. In order to effect curing under more mild conditions, it is preferred to add a silanol condensation catalyst. Such catalysts may include alkali metal salts of carboxylic acids (e.g. sodium acetate, potassium formate), amine carboxylates (e.g. dimethylamine acetate, ethanolamine acetate, dimethylaniline formate), quaternary ammonium carboxylates (e.g. tetramethylammonium acetate), metal salts of carboxylic acids (e.g. tin octoate), amines (e.g. triethanolamine, pyridine), alkaline hydroxides (e.g. sodium hydroxide, ammonium hydroxide) and so on. It is also possible to use an amine type silane coupling agent (e.g. γ-aminopropyltriethoxysilane, N-(β-aminoethyl)-γ-aminopropyltrimethoxysilane), and the aluminum chelate compound to be used as the catalyst in the present invention is also effective as the curing catalyst of the film.

The amount of these catalysts formulated, which can be varied widely depending on the curing conditions, may be generally 0.05 to 0.5 part by weight, preferably about 0.1 part by weight, based on the total film forming components.

When the catalyst is employed within the above range, a transparent film, excellent in abrasion resistance, can be formed by heating the composition to about 75° to 120° C. on the substrate.

With the use of a composition for coating containing such a UV-absorber formulated therein according to the present invention, it is possible to obtain a film excellent in adhesion, heat-shock resistance, hot water resistance, boiling water resistance, heat resistance, humidity resistance, abrasion resistance and weathering resistance. More particularly, even when the film obtained by coating of the composition on transparent plastics substrate is exposed to UV-rays, discoloration will occur only with difficulty. Also, on a polymethacrylate substrate, a film with good adhesion can be obtained without application of a primer. Further, on a polycarbonate substrate with good heat resistance, a film with more improved heat resistance can be obtained than using unmodified (C) as a UV-absorber. Moreover, the UV-absorber to be used in the present invention is a polymer, and yet it is suitable for the copolymerization reaction with the partial organosilane triol condensate (polysiloxane) in the composition for coating, whereby inclination for evaporation in the step of forming a film by heat curing can greatly be reduced.

EXAMPLES

The present invention is further illustrated by referring to the following Examples and Comparative examples, in which all the parts and percentages are by weight.

Preparation example 1

(1) A mixture of 250 parts of 2,4-dihydroxybenzophenone, 375 parts of γ-glycidoxypropyltrimethoxysilane, 175 parts of toluene and 0.625 part of aluminum trisacetylacetonate was heated to 120° C. under stirring. The reaction was continued for about 10 hours, while removing the methanol formed during the reaction. The reaction temperature reached 140° C. Subsequently, under reduced pressure of 20–100 mmHg, toluene was evaporated at 140° C. to give a yellowish brown, transparent and viscous reaction product (S-1).

The molecular weight of the product was determined by GPC (Model HLC 802UR, produced by Toyo Soda Kogyo K.K.) with reference to the calibration curve of polystyrene to find that it was a copolymer with a weight average molecular weight of 2000.

(2) From a mixture of 246 parts of 2,2′,4,4′-tetrahydroxybenzophenone, 615 parts of β-(3,4-epoxycyclohexyl)ethyltrimethoxysilane, 250 parts of toluene and 5 parts of aluminum ethylbisacetoacetonate, following the same procedure as in Preparation example 1 experiment (1), a reaction product (S-2), transparent with yellowish brown color and having a weight average molecular weight of 3000, was obtained.

(3) A mixture of 214 parts of 4,4′-dihydroxybenzophenone, 472 parts of γ-glycidoxypropyltrimethoxysilane and 1 part of aluminum trisacetylacetonate was heated to 130° C. over about one hour. While maintaining the reaction temperature at 130° C., the reaction was continued while removing methanol for about 8 hours to obtain a reaction product (S-3). This product was transparent with yellowish brown color, viscous and had a weight average molecular weight of 1500.

(4) Preparation example 1 experiment (1) was repeated except for employing 300 parts of the compound of the formula shown below in place of 250 parts of 2,4-dihydroxybenzophenone to obtain a yellowish brown, transparent reaction product (S-4) with a weight average molecular weight of 2200.

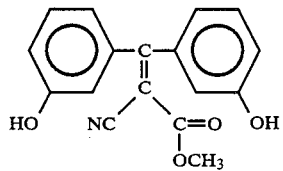

(5) For comparative purpose, 2,4-dihydroxybenzophenone was employed as the UV-absorber (R-1).

(6) A mixture of 246 parts of 2,2′,4,4′-tetrahydroxybenzophenone, 492 parts of β-(3,4-epoxycyclohexyl)ethyltrimethoxysilane and 5 parts of tetramethylammonium chloride was heated to 80° C. under stirring. While maintaining the reaction temperature at 80° C., the reaction was continued for about 8 hours to obtain a reaction product (R-2) represented by the following formula:

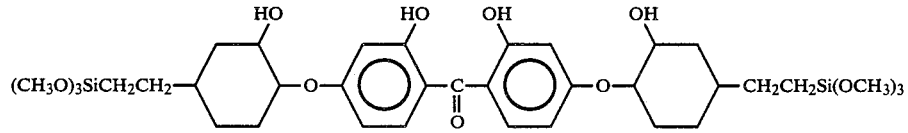

Preparation example 2

(1) 220 Parts of Ludox (trade name, produced by Du Pont de Nemours & Company, U.S.A., colloidal silica, solid concentration 30%, pH 8.2, average particle size 12 mµ) were added to a solution comprising 1 part of anhydrous acetic acid and 270 parts of methyltrimethoxysilane, and the reaction was carried out at 25° to 30° C. for 24 hours to obtain a reaction mixture with a solid content of 41%. After adjusting the solid content to 20% by addition of isobutanol, the mixture was filtered to obtain a composition for coating (B-1).

(2) 400 Parts of Snowtex (trade name, produced by Nissan Kagaku K.K., solid concentration 20%, pH 8.5, average particle size 15 mµ) were added to a solution comprising 1.5 parts of anhydrous acetic acid and 300 parts of methyltriethoxysilane, and the reaction was carried out at a temperature of 25° to 30° C. under stirring for 16 hours to obtain a reaction mixture with a concentration of the film forming components of 27.5%. Subsequently, 500 parts of isobutanol as the alcohol for azeotropic distillation were added and excessive water was removed in an azeotropic system of water-alcohol under a reduced pressure of 20–150 mmHg, to obtain a reaction mixture with a solid content of 50%. After adding a solvent mixture comprising 25% of isopropyl alcohol, 50% of isobutyl alcohol and 25% of ethylene glycol monoethyl ether acetate to the solution to adjust the solid content to 20%, the mixture was filtered to obtain a composition for coating (B-2).

EXAMPLE 1

UV-absorbers S-1 through S-4 and R-1 and R-2 prepared in Preparation example 1 were respectively added to 100 parts of the compositions B-1 and B-2 prepared in Preparation example 2 in amounts (parts) as indicated in Table 1 to obtain Samples 1–15. In these samples, Sample 11 contains no UV-absorber, Samples 12–14 are systems in which 2,4-dihydroxybenzophenone was added, and Sample 15 is a sample for comparative purpose in which a 1:2 reaction product between 2,2′,4,4′-tetrahydroxybenzophenone and β-(3,4-epoxycyclohexyl)ethyltrimethoxysilane (not the polymer as mentioned in the present invention) was added.

TABLE 1

| Sample No. | Coating composition | UV-absorber Kind | Amount, parts |
|---|---|---|---|
| 1 | B - 1 | S - 1 | 1.8 |
| 2 | B - 1 | S - 1 | 3.6 |
| 3 | B - 1 | S - 2 | 3.0 |
| 4 | B - 1 | S - 3 | 3.0 |
| 5 | B - 1 | S - 4 | 3.0 |
| 6 | B - 2 | S - 1 | 3.6 |
| 7 | B - 2 | S - 1 | 5.4 |
| 8 | B - 2 | S - 2 | 4.5 |
| 9 | B - 2 | S - 3 | 4.5 |
| 10 | B - 2 | S - 4 | 4.5 |
| Comparative examples: | | | |
| 11 | B - 1 | — | — |
| 12 | B - 1 | R - 1 | 1.6 |
| 13 | B - 2 | R - 1 | 0.8 |
| 14 | B - 2 | R - 1 | 1.6 |
| 15 | B - 2 | R - 2 | 3.2 |

Each of Samples 1–15 was applied according to the flow coating method on a polycarbonate plate (trade name: Lexan Sheet 9030, produced by General Electric Co.) which was coated with a primer (trade name: PH 91, produced by Toshiba Silicone Co., Ltd.), followed by heating at 120° C. for one hour to obtain a cured film. Further, on a polymethylmethacrylate plate (trade name: Acrypet VH, produced by Mitsubishi Rayon K.K.) was directly applied the same composition for coating as above according to the spray coating method, followed by heating at 90° C. for 3 hours to obtain a cured film.

For these cured films, adhesion, heat-shock resistance, hot water resistance, boiling water resistance, heat resistance, humidity resistance, abrasion resistance and weathering resistance were measured under the following conditions, respectively.

Adhesion

On the cured film were prepared 100 cross-cut checkers with 1 mm widths, and on the cross-cut surface was plastered Cellophane tacky tape, which was strongly drawn in the direction perpendicular to the film, and the state of the film peeled off was observed.

Heat-shock resistance

By means of the heat shock tester produced by Tabai Seisakusho, the test specimen was exposed to respective temperature atmospheres of one cycle of −30° C., 3 hours⟷120° C., 3 hours, which cycle was repeated 5 times, and the appearance and adhesion of the film were observed.

Hot water resistance

After the test specimen was immersed in hot water at 65° C. for 200 hours, the appearance and adhesion of the film were observed.

Boiling water resistance

After the test specimen was immersed in boiling water for one hour, adhesion was observed.

Heat resistance

The test specimen was thrown into an atmosphere of 120° C. for 200 hours, and it was observed whether cracks were formed on the film or not.

Humidity resistance

After the test specimen was thrown into an atmosphere of a temperature of 60° C. and a humidity of 98% for 200 hours, the state and adhesion of the film were observed.

Abrasion resistance

By means of the Taber abrader produced by Toyo Seiki K.K., the surface of the test specimen was flawed under the conditions of the truck wheel CS-10, the load of 500 g and 500 cycles, and the degree of flaw is expressed in terms of haze value (ΔH, %) as analyzed by Direct-reading Haze Computer produced by Suga Tester K.K.

Weathering resistance

After exposure for 2000 hours by means of Sunshine weathermeter weathering accelerating tester (produced by Toyo Seiki K.K.), the appearance and adhesion were observed.

Table 2 shows the evaluation results when employing the polycarbonate test specimens, and Table 3 those when employing the polymethylmethacrylate test specimens.

TABLE 2

| Sample No. | Adhesion | Heat-shock resistance | Boiling water resistance | Heat resistance | Abrasion resistance (ΔH %) | Weathering resistance |
|---|---|---|---|---|---|---|
| 1 | Good | No abnormality | No abnormality | No abnormality | 3.0 | Good |
| 2 | " | " | " | " | 4.5 | " |
| 3 | " | " | " | " | 5.0 | " |
| 4 | " | " | " | " | 3.7 | " |
| 5 | " | " | " | " | 5.0 | " |
| 6 | " | " | " | " | 2.0 | " |
| 7 | " | " | " | " | 3.5 | " |
| 8 | " | " | " | " | 3.1 | " |
| 9 | " | " | " | " | 3.7 | " |
| 10 | " | " | " | " | 4.0 | " |
| Comparative examples: | | | | | | |
| 11 | Good | No abnormality | No abnormality | No abnormality | 2.5 | Film spontaneously peeled off |
| 12 | Bad | Cracks formed | Cracks formed Bad adhesion | Cracks formed | 10.5 | Bad |
| 13 | Good | " | Bad adhesion | " | 2.5 | " |
| 14 | Bad | " | Cracks formed Bad adhesion | " | 25.0 | Cracks formed Bad adhesion |
| 15 | Good | " | Cracks formed Bad adhesion | " | 9.5 | Cracks formed Bad adhesion |

TABLE 3

| Sample No. | Adhesion | Hot water resistance | Humidity resistance | Abrasion resistance (ΔH %) | Weathering resistance |
|---|---|---|---|---|---|

TABLE 3-continued

| | Evaluation items | | | | |
|---|---|---|---|---|---|
| | Adhesion | Hot water resistance | Humidity resistance | Abrasion resistance ($\Delta H$ %) | Weathering resistance |
| 1 | Good | No abnormality | No abnormality | 4.5 | Good |
| 2 | " | " | " | 5.8 | " |
| 3 | " | " | " | 5.0 | " |
| 4 | " | " | " | 5.5 | " |
| 5 | " | " | " | 6.0 | " |
| 6 | " | " | " | 3.5 | " |
| 7 | " | " | " | 4.5 | " |
| 8 | " | " | " | 4.9 | " |
| 9 | " | " | " | 4.2 | " |
| 10 | " | " | " | 5.5 | " |
| Comparative examples: | | | | | |
| 11 | Bad | Bad adhesion | Bad adhesion | 20.0 | Bad |
| 12 | " | " | Film whitened Bad adhesion | 35.0 | " |
| 13 | " | " | Bad adhesion | 15.0 | " |
| 14 | " | " | Film whitened Bad adhesion | 25.5 | " |
| 15 | Good | " | Bad adhesion | 10.5 | Good |

EXAMPLE 2

According to the same procedure as in Preparation example 2 experiment (2) except for substituting 285 parts of methyltriethoxysilane and 15 parts of phenyltrimethoxysilane for 300 parts of methyltriethoxysilane, a composition (B-3) was prepared.

To 100 parts of B-3, 3.0 parts each of UV-absorbers S-1 to S-4 obtained in Preparation example 1 were added to obtain Samples 16-19.

Samples 16-19 were applied by spray coating on polymethylmethacrylate plates similarly as in Example 1, followed by curing, and the cured films were evaluated similarly. The results are shown in Table 4.

TABLE 4

| | Evaluation items | | | | |
|---|---|---|---|---|---|
| Sample No. | Adhesion | Hot water resistance | Humidity resistance | Abrasion resistance ($\Delta H$ %) | Weathering resistance |
| 16 | Good | No abnormality | No abnormality | 4.5 | Good |
| 17 | " | " | " | 5.8 | " |
| 18 | " | " | " | 5.0 | " |
| 19 | " | " | " | 5.5 | " |

We claim:

1. A composition for coating, which comprises:
   (1) 100 parts by weight of film forming components comprising:
   (A) 10 to 90% by weight of an organosilane triol of the following formula and/or its partial condensate:

$R^1Si(OH)_3$ wherein $R^1$ represents a monovalent group selected from the group consisting of alkyl groups having 1 to 3 carbon atoms and aryl groups, and
   (B) 90 to 10% by weight of colloidal silica; and
   (2) 5 to 40 parts by weight of a copolymer of:
   (C) a compound represented by the formula:

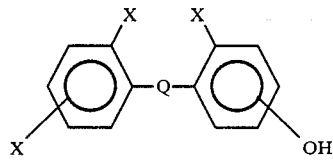

wherein Q represents $>$C$=$O or the following formula:

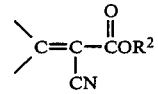

wherein each X may be either the same or different and each represents hydrogen atom or hydroxyl group, of which at least one is hydroxyl group, and $R^2$ represents an alkyl group having 1 to 18 carbon atoms, and
   (D) an epoxy group-containing trialkoxysilane.

2. The composition for coating according to claim 1, wherein Component (C) is 2,4-dihydroxybenzophenone.

3. The composition for coating according to claim 1, wherein Component (D) is γ-glycidoxypropyltrimethoxysilane or β-(3,4-epoxycyclohexyl)ethyltrimethoxysilane.

4. The composition for coating according to claim 1, wherein Component (2) is added in an amount of 15 to 30 parts by weight.